United States Patent
Yamaura et al.

(10) Patent No.: US 9,106,417 B2
(45) Date of Patent: Aug. 11, 2015

(54) COMMUNICATION APPARATUS FOR TRANSMISSION PROTOCOL PROCESSING AND RECEPTION PROTOCOL PROCESSING

(75) Inventors: Takahiro Yamaura, Kanagawa (JP); Shingo Tanaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 82 days.

(21) Appl. No.: 13/215,465

(22) Filed: Aug. 23, 2011

(65) Prior Publication Data

US 2012/0027027 A1 Feb. 2, 2012

Related U.S. Application Data

(63) Continuation of application No. PCT/JP2009/066047, filed on Sep. 14, 2009.

(30) Foreign Application Priority Data

Feb. 27, 2009 (JP) ................. 2009-047105

(51) Int. Cl.
*H04L 1/16* (2006.01)
*H04L 1/18* (2006.01)
(Continued)

(52) U.S. Cl.
CPC ............ *H04L 1/1671* (2013.01); *H04L 1/1832* (2013.01); *H04L 47/18* (2013.01); *H04L 47/27* (2013.01); *H04L 49/90* (2013.01); *H04L 69/24* (2013.01)

(58) Field of Classification Search
USPC ............ 370/389, 392, 394, 395.52; 709/204, 709/220–225, 228, 230–236, 245, 250
See application file for complete search history.

(56) References Cited

U.S. PATENT DOCUMENTS 5,678,060 A * 10/1997 Yokoyama et al. ........... 709/212
6,005,849 A * 12/1999 Roach et al. .................. 370/276
(Continued)

FOREIGN PATENT DOCUMENTS

JP 06-132981 5/1994
JP 2000-022744 1/2000
(Continued)

OTHER PUBLICATIONS

Japanese Office Action for Japanese Application No. 2009-047105 mailed on Sep. 18, 2012.
(Continued)

*Primary Examiner* — Habte Mered
(74) *Attorney, Agent, or Firm* — Amin, Turocy & Watson, LLP

(57) ABSTRACT

According to one embodiment, a communication apparatus includes a reception protocol processing unit, a control information queue, and a transmission protocol processing unit. The reception protocol processing unit performs a protocol process using control information included in a received frame, acquires the control information from the received frame, and acquires data when the data is included in the frame. The control information queue stores control information including at least one of a reception window size of other communication apparatus, area information representing an area of data received by the other communication apparatus, the reception window size of the communication apparatus, and area information representing an area of data received by the communication apparatus. The transmission protocol processing unit performs a protocol process using the control information stored in the control information queue, generates a frame of a transmission target, and transmits the frame through the network interface unit.

15 Claims, 11 Drawing Sheets

(51) Int. Cl.
*H04L 12/801* (2013.01)
*H04L 12/807* (2013.01)
*H04L 12/861* (2013.01)
*H04L 29/06* (2006.01)

(56) References Cited

U.S. PATENT DOCUMENTS

| | | | |
|---|---|---|---|
| 6,981,014 B2* | 12/2005 | Jayam et al. | 709/200 |
| 7,237,031 B2* | 6/2007 | Cheng | 709/230 |
| 7,363,572 B2* | 4/2008 | Sidenblad et al. | 714/758 |
| 8,174,975 B2* | 5/2012 | Lindsay | 370/230 |
| 2004/0054996 A1* | 3/2004 | Srinivas et al. | 718/1 |
| 2006/0168281 A1* | 7/2006 | Starr et al. | 709/230 |
| 2006/0262797 A1* | 11/2006 | Biran et al. | 370/392 |
| 2007/0076621 A1* | 4/2007 | Malhotra et al. | 370/252 |
| 2008/0056124 A1* | 3/2008 | Nanda et al. | 370/229 |

FOREIGN PATENT DOCUMENTS

| | | |
|---|---|---|
| JP | 2001-517895 | 10/2001 |
| JP | 2004-072372 | 3/2004 |
| JP | 2005-278001 | 10/2005 |
| JP | 2006-086611 | 3/2006 |
| JP | 2006-526969 | 11/2006 |
| WO | 2004110025 | 12/2004 |

OTHER PUBLICATIONS

Japanese Office Action for Japanese Application No. 2009-047105 mailed on May 15, 2012.

International Search Report for International Application No. PCT/JP2009/066047 mailed on Dec. 1, 2009.

* cited by examiner

COMMUNICATION APPARATUS FOR TRANSMISSION PROTOCOL PROCESSING AND RECEPTION PROTOCOL PROCESSING

CROSS-REFERENCE TO RELATED APPLICATIONS

This application is a continuation of PCT international application Ser. No. PCT/JP2009/066047 filed on Sep. 14, 2009 which designates the United States; the entire contents of which are incorporated herein by reference.

FIELD

Embodiments described herein relate generally to a communication apparatus, a method, and a program product.

BACKGROUND

Conventionally, there have been communication apparatuses that perform transmission and reception of data via a network using a protocol that performs transmission control of a frame using information of a frame received from a communication counterpart. Such communication apparatuses includes, as disclosed in, for example, JP-A 2004-072372 (KOKAI), a communication apparatus that performs a protocol process related to reception (referred to as "reception protocol process") and a protocol process related to transmission (referred to as "transmission protocol process") in a series of operations by using a general-purpose processor. The protocol process refers to a process defined by each protocol used for communication.

In the case of implementing transmission and reception of data using a plurality of processors in order to increase the speed or the like, the reception protocol process and the transmission protocol process operate independently of each other. However, in a technique of JP-A 2004-072372 (KOKAI), synchronization between the reception protocol process and the transmission protocol process cannot be implemented, and it has been difficult to independently operate the reception protocol process and the transmission protocol process.

DETAILED DESCRIPTION

In general, according to one embodiment, a communication apparatus includes a reception protocol processing unit, a control information queue, and a transmission protocol processing unit. The reception protocol processing unit performs a protocol process using control information included in a received frame, acquires the control information from the received frame, and acquires data when the data is included in the frame. The control information queue stores control information including at least one of a reception window size of other communication apparatus, area information representing an area of data received by the other communication apparatus, the reception window size of the communication apparatus, and area information representing an area of data received by the communication apparatus. The transmission protocol processing unit performs a protocol process using the control information stored in the control information queue, generates a frame of a transmission target, and transmits the frame through the network interface unit.

Hereinafter, exemplary embodiments of a communication apparatus, a method, and a program will be described in detail with reference to the accompanying drawings.

An exemplary embodiment of a communication apparatus will be described below with reference to the accompanying drawings. Here, a hardware configuration of the communication apparatus will be described. The communication apparatus of the present embodiment includes a control unit, such as a central processing unit (CPU), that controls the whole apparatus, a storage unit, such as a read only memory (ROM) or a random access memory (RAM), that stores various data or various programs, an external storage unit, such as a hard disk drive (HDD) or a compact disk (CD) drive device, that stores various data or various programs, a communication interface (I/F) that controls communication of an external device, and a bus that connects the components with one another. The communication apparatus has a hardware configuration using a typical computer.

Figure 1:
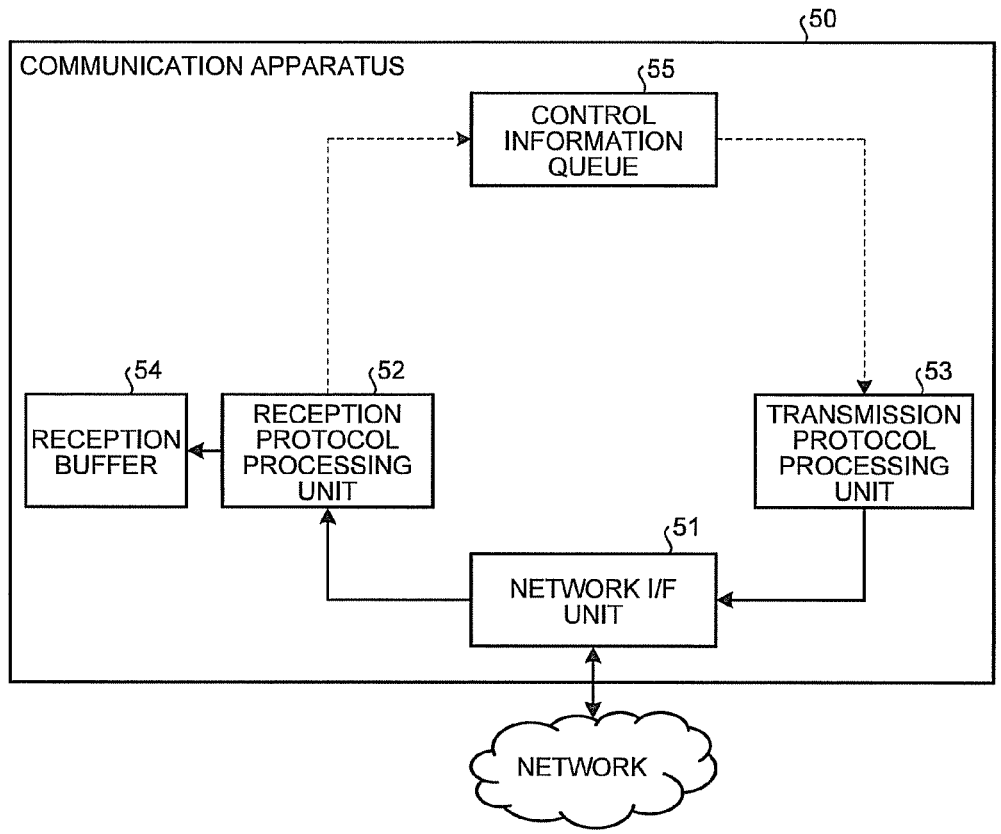
FIG. 1 is a diagram illustrating a functional configuration of a communication apparatus according to a first embodiment.

Next, various functions implemented in such a hardware configuration by executing various programs stored in the storage device or the external storage unit through the CPU of the communication apparatus will be described. FIG. 1 is a diagram illustrating a functional configuration of a communication apparatus 50. The communication apparatus 50 includes a network I/F unit 51, a reception protocol processing unit 52, a transmission protocol processing unit 53, a reception buffer 54, and a control information queue 55. The network I/F unit 51, the reception protocol processing unit 52, and the transmission protocol processing unit 53 are generated on a storage unit such as a RAM at the time of program execution by the CPU. The reception buffer 54 and the control information queue 55 are storage areas secured in a storage unit such as a RAM. The communication apparatus 50 has a transmission buffer (not shown). For example, the transmission buffer is a storage area secured in a storage unit such as a RAM and stores data of a transmission target.

The network I/F unit 51 is a device that performs processes of a physical layer and a data link layer and performs transmission and reception of a frame with other communication apparatus via a network that conforms to, for example, an IEEE 802.3 standard or an IEEE 802.11 standard. The reception protocol processing unit 52 performs a protocol process related to reception (a reception protocol process) on a frame received by the network I/F unit 51 (referred to as "reception frame"), acquires control information included in the reception frame, stores control information including at least the acquired control information in the control information queue 55, and stores data in the reception buffer 54 when the data is included in the reception frame. The details of the control information will be described later in detail. The reception buffer 54 stores data included in the reception frame under control of the reception protocol processing unit 52. The control information queue 55 stores the control information under control of the reception protocol processing unit 52. The transmission protocol processing unit 53 acquires control information from the control information queue 55, performs a protocol process related to transmission (a transmission protocol process) according to the control information, generates a frame including an acknowledgement (ACK) for acknowledging reception of the reception frame or a frame including data of a transmission target, and transmits the generated frame through the network I/F unit 51.

Figure 2:
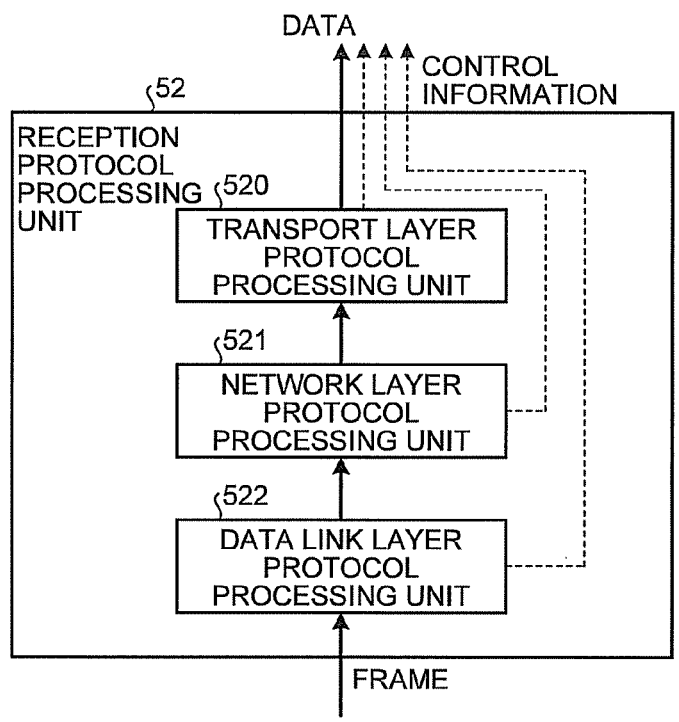
FIG. 2 is a diagram illustrating an internal configuration of a reception protocol processing unit according to the embodiment.

FIG. 2 is a diagram illustrating an internal configuration of the reception protocol processing unit 52. The reception protocol processing unit 52 includes a data link layer protocol processing unit 522, a network layer protocol processing unit 521, and a transport layer protocol processing unit 520 and performs the reception protocol process in an order of the data link layer, the network layer, and the transport layer. The data link layer protocol processing unit 522 receives the frame (the reception frame) through the network I/F unit 51 and performs the reception protocol process in the data link layer on the reception frame. After the data link layer protocol processing unit 522 performs the reception protocol process, the network layer protocol processing unit 521 performs the reception protocol process in the network layer on the reception frame. After the network layer protocol processing unit 521 performs the reception protocol process, the transport layer protocol processing unit 520 performs the reception protocol process in the transport layer on the reception frame, acquires control information, and stores control information including at least the acquired control information in the control information queue 55. The transport layer protocol processing unit 520 stores data in the reception buffer 54 if the data is included in the reception frame.

Figure 3:
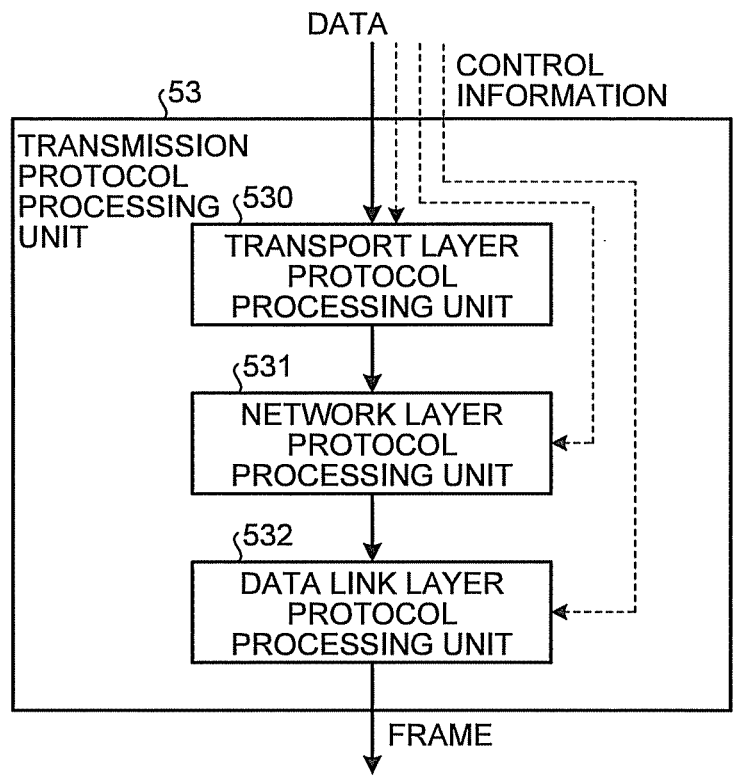
FIG. 3 is a diagram illustrating an internal configuration of a transmission protocol processing unit according to the embodiment.

FIG. 3 is a diagram illustrating an internal configuration of the transmission protocol processing unit 53. The transmission protocol processing unit 53 includes a data link layer protocol processing unit 532, a network layer protocol processing unit 531, and a transport layer protocol processing unit 530 and performs the transmission protocol process in an order of the transport layer, the network layer, and the transport layer. The transport layer protocol processing unit 530 acquires control information from the control information queue 55 and performs the transmission protocol process in the transport layer according to the control information to generate a frame of a transmission target. After the transport layer protocol processing unit 530 performs the transmission protocol process, the network layer protocol processing unit 531 performs the transmission protocol process in the network layer on the frame of the transmission target. After the network layer protocol processing unit 531 performs the transmission protocol process, the data link layer protocol processing unit 532 outputs the frame of the transmission target to the network I/F unit 51. The frame of the transmission target is transmitted to a counterpart apparatus through the network I/F unit 51.

The transport layer protocol processing units 520 and 530 perform, as the protocol process of the transport layer, a process (a protocol process) defined by a protocol such as a transmission control protocol (TCP), a stream control transmission protocol (SCTP), a datagram congestion control protocol (DCCP), an Internet control message protocol (ICMP), and an ICMPv6. The network layer protocol processing units 521 and 531 perform, as the protocol process of the network layer, a process (a protocol process) defined by a protocol such as an Internet protocol version 4 (IPv4), an Internet protocol version 6 (IPv6), and an address resolution protocol (ARP). The data link layer protocol processing units 522 and 532 perform, as the protocol process of the data link layer, a process (a protocol process) defined by a protocol such as an IEEE 802.3 or an IEEE 802.11.

A description will be made below in connection with a case in which the TCP is used as the protocol of the transport layer. In this case, the reception protocol processing unit 52 performs a check of a sequence number defined by an RFC 793, corruption detection of the reception frame by a checksum comparison, acquisition of the reception window size of another communication apparatus (referred to as "counterpart apparatus") that is a communication counterpart, acquisition of an acknowledgement sequence number of the counterpart apparatus, a check of an acknowledgement (ACK) flag, and the like in the reception protocol process by using the reception frame. The sequence number is assigned by the counterpart apparatus and represents an area of data received by the communication apparatus 50. The reception window size of the counterpart apparatus represents the data capacity of the reception buffer of the counterpart apparatus. The acknowledgement sequence number of the counterpart apparatus represents an area of data to be next received by the counterpart apparatus. The acknowledgement (ACK) flag represents whether or not the acknowledgement sequence number is valid. The transmission protocol processing unit 53 performs assignment of the sequence number, assignment of the checksum, assignment of the reception window size of the communication apparatus 50, assignment of the acknowledgement sequence number of the communication apparatus 50, setting of the acknowledgement (ACK) flag, and the like in the transmission protocol process. Here, the sequence number to be assigned represents an area of data received by the counterpart apparatus. The reception window size of the communication apparatus 50 represents the data capacity of the reception buffer 54. Further, the acknowledgement sequence number to be assigned represents an area of data to be next received by the communication apparatus 50 and is expressed by using the sequence number assigned by the counterpart apparatus.

The control information includes at least one of the reception window size of the counterpart apparatus, an acknowledgement sequence number or a sequence number of a selective acknowledgement (Selective ACK) block of the counterpart apparatus, the reception window size of the communication apparatus 50, an acknowledgement sequence number or a sequence number of a selective acknowledgement (Selective ACK) block of the communication apparatus 50, and a transmission request of a frame including an acknowledgment. Particularly, when a frame that requires to transmit a frame including an acknowledgement is received, the reception protocol processing unit 52 includes the transmission request of the frame including the acknowledgement in the control information and stores the control information in the control information queue 55.

Figure 4:
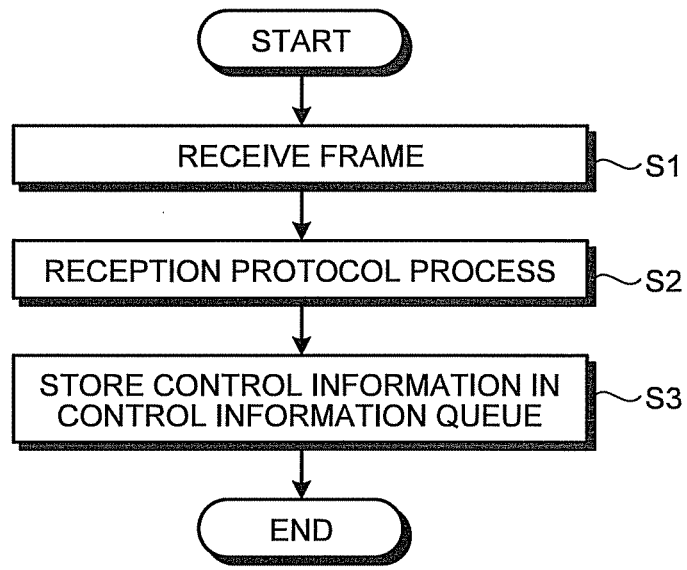
FIG. 4 is a flowchart illustrating a procedure of a reception process according to the embodiment.

Next, procedures of a reception process and a transmission process performed by the communication apparatus 50 according to the present embodiment will be described. The communication apparatus 50 performs the reception process and the transmission process independently of each other. First, the procedure of the reception process will be described with reference to FIG. 4. The communication apparatus 50 receives a frame (reception frame) from another communication apparatus via the network through the function of the network I/F unit 51 (step S1). Next, the communication apparatus 50 performs the reception protocol process on the reception frame received in step S1 through the function of the reception protocol processing unit 52, acquires control information from the reception frame, and stores data in the reception buffer 54 when the data is included in the reception frame (step S2). In the reception protocol process, the communication apparatus 50 judges whether or not a frame including an acknowledgement is to be transmitted based on a data length of a frame, a sequence number of a frame, a status of a session, and the like according to a process defined by the RFC 793. When it is judged that the frame is to be transmitted, since the sequence number and the reception window size of the counterpart apparatus are included in the control information, control information in which the transmission request of the frame including the acknowledgement is included together with them is stored in the control information queue 55 (step S3). Meanwhile, when it is judged that transmission of the frame including the acknowledgement such as a frame including an acknowledgement that does not include data is not to be performed, since the reception window size and the acknowledgement sequence number of the counterpart apparatus are included in the control information, the communication apparatus 50 stores the control information including them in the control information queue 55 (step S3).

Figure 5:
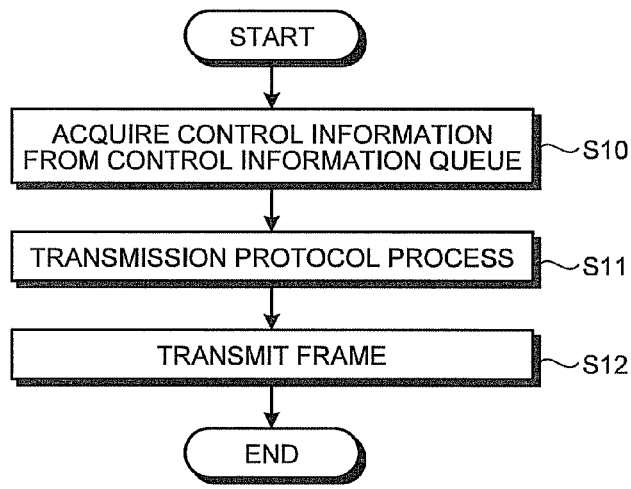
FIG. 5 is a flowchart illustrating a procedure of a transmission process according to the embodiment.

Subsequently, the procedure of the transmission process will be described with reference to FIG. 5. The communication apparatus 50 acquires the control information from the control information queue 55 through the function of the transmission protocol processing unit 53 (step S10). Next, the communication apparatus 50 performs the transmission protocol process using the control information (step S11). Specifically, when the control information includes a transmission request of a frame including an acknowledgement, the communication apparatus 50 performs the transmission protocol process in the transport layer, generates, according to the transmission request of the frame including the acknowledgement, a frame including an acknowledgement by assigning the acknowledgement sequence number using the sequence number and the reception window size of the counterpart apparatus included in the control information, performs the protocol process in the network layer and the protocol process in the data link layer, and then transmits the frame including the acknowledgement via the network (step S12). When the control information does not include the transmission request including the acknowledgement, the communication apparatus 50 performs flow controls using the reception window size of the counterpart apparatus and performs release of data of the sequence number smaller than a value of the acknowledgement sequence number of the counterpart apparatus stored in the reception buffer for retransmission of data.

As described above, in the communication apparatus that performs communication via the network using the protocol for performing transmission control of the frame using the reception frame, by transmitting the control information from the reception protocol processing unit 52 to the transmission protocol processing unit 53 using the control information queue 55, synchronization between the reception protocol process and the transmission protocol process can be implemented. As a result, the reception protocol processing unit 52 and the transmission protocol processing unit 53 can operate independently of each other.

Next, a second embodiment of a communication apparatus, a method, and a program will be described. Parts that are common in the first embodiment will be described using the same reference numerals and a description thereof will be omitted.

Figure 6:
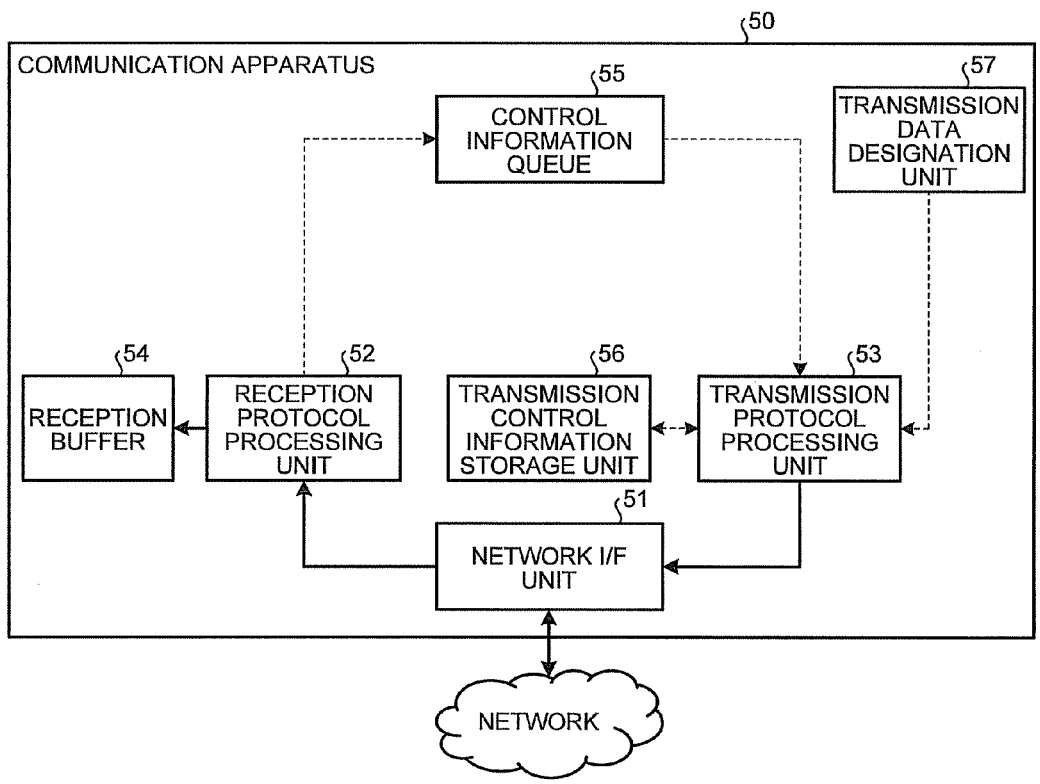
FIG. 6 is a diagram illustrating a functional configuration of a communication apparatus according to a second embodiment.

In the present embodiment, two different transmission processes will be distinctively described. One is a process of transmitting a frame according to control information (referred to as a control information process), which has been described in the first embodiment, and the other is a process of transmitting a frame including data designated by, for example, an application program (a data transmission process). FIG. 6 is a diagram illustrating a functional configuration of a communication apparatus 50 according to the present embodiment. The communication apparatus 50 further includes a transmission control information storage unit 56 and a transmission data designation unit 57 in addition to the configuration of the communication apparatus 50 according to the first embodiment. The transmission control information storage unit 56 stores the control information under control of the transmission protocol processing unit 53. The transmission data designation unit 57 is generated on a storage unit such as a RAM by executing an application program through the CPU and designates an address and a data length of data of a transmission target.

Figure 7:
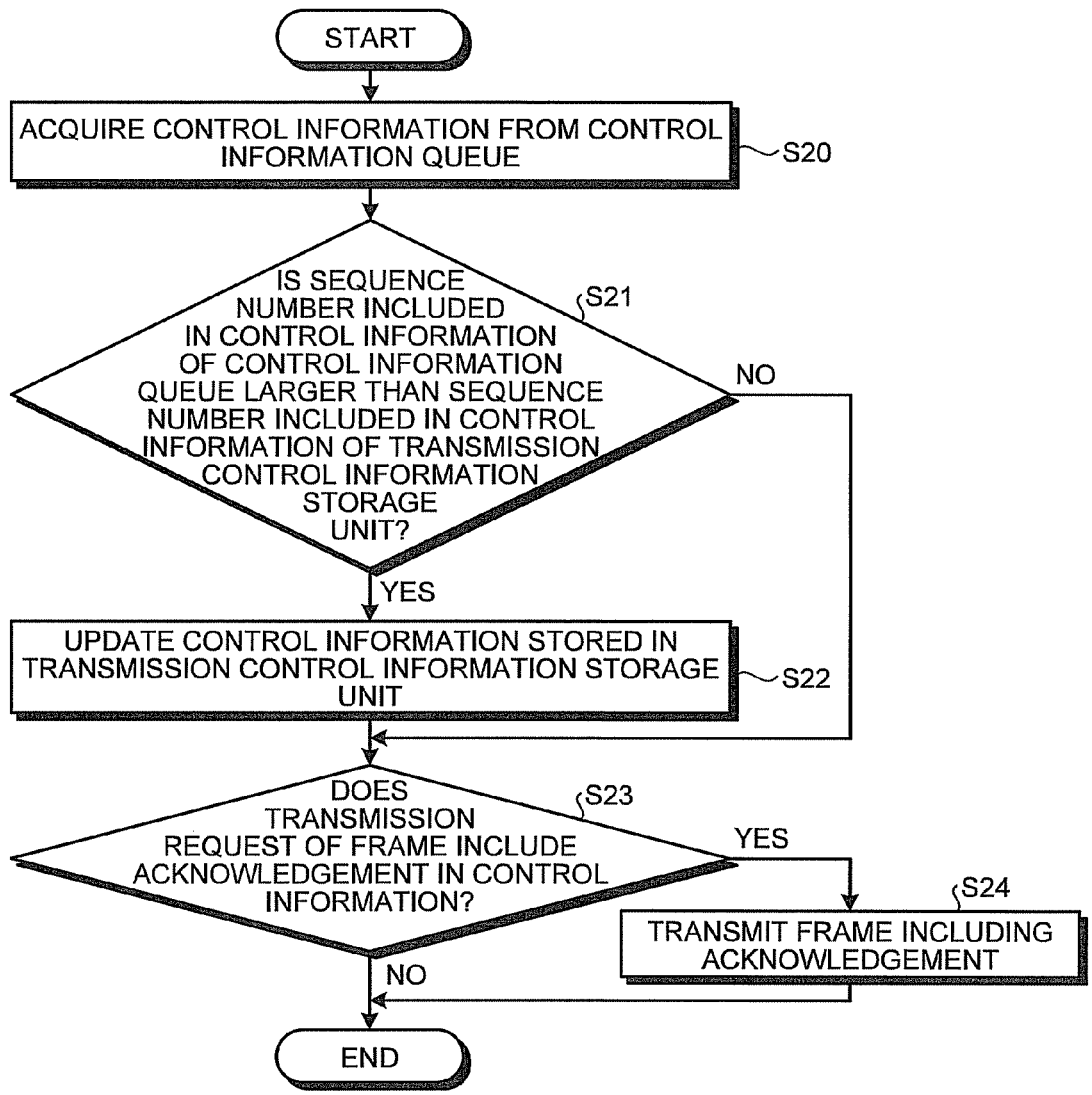
FIG. 7 is a flowchart illustrating a procedure of a control information process according to the embodiment.

Next, a process of a transmission process performed by the communication apparatus 50 according to the present embodiment will be described. A reception process is the same as in the first embodiment, and thus a description thereof is omitted. First, a procedure of a control information process will be described with reference to FIG. 7. The communication apparatus 50 acquires control information from the control information queue 55 through the function of the transmission protocol processing unit 53 (step S20). It is assumed that the sequence number of the counterpart apparatus is included in the control information. The communication apparatus 50 compares the sequence number of the counterpart apparatus included in the control information with the sequence number of the counterpart apparatus included in the control information stored in the transmission control information storage unit 56 and judges whether or not the former sequence number is larger than the latter sequence number (step S21). When the former sequence number is larger than the latter sequence number (Yes in step S21), the communication apparatus 50 updates the control information stored in the transmission control information storage unit 56 to the control information acquired from the control information queue 55 (step S22). As a result, the control information including the largest sequence number is stored in the transmission control information storage unit 56. Through such a configuration, even when a frame of a large sequence number is received prior to a frame of a small sequence number, for example, due to the occurrence of some communication failure, it is possible to correctly judge the largest sequence number as the sequence number of the latest frame transmitted from the counterpart apparatus. Incidentally, when the judgment result of step S21 is negative, the communication apparatus 50 does not update the control information stored in the transmission control information storage unit 56. The communication apparatus 50 judges whether or not the transmission request of the frame including the acknowledgement is included in the control information (step S23). When the transmission request of the frame including the acknowledgement is included (Yes in step S23), the frame including the acknowledgement is generated and transmitted via the network as described in the first embodiment (step S24).

Figure 8:
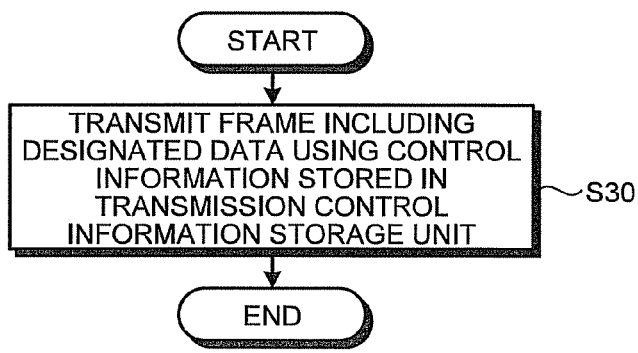
FIG. 8 is a flowchart illustrating a transmission process according to the embodiment.

Next, a process of a data transmission process will be described with reference to FIG. 8. The communication apparatus 50 designates an address and a data length of data of a transmission target through the function of the transmission data designation unit 57. The communication apparatus 50 acquires data of the designated data length from the designated address, generates a frame including the data using control information stored in the transmission control information storage unit 56, performs the transmission protocol process, and transmits the frame via the network through the function of the transmission protocol processing unit 53 (step S30).

As described above, by installing the transmission control information storage unit 56 that stores the control information including the largest sequence number at the transmission side, even in the data transmission process that operates independently of the control information process that transmits the frame using the control information, it is possible to perform the transmission protocol process using the latest control information.

Next, a third embodiment of a communication apparatus, a method, and a program will be described. Parts that are common in the first embodiment or the second embodiment will be described using the same reference numerals or a description thereof will be omitted.

Figure 9:
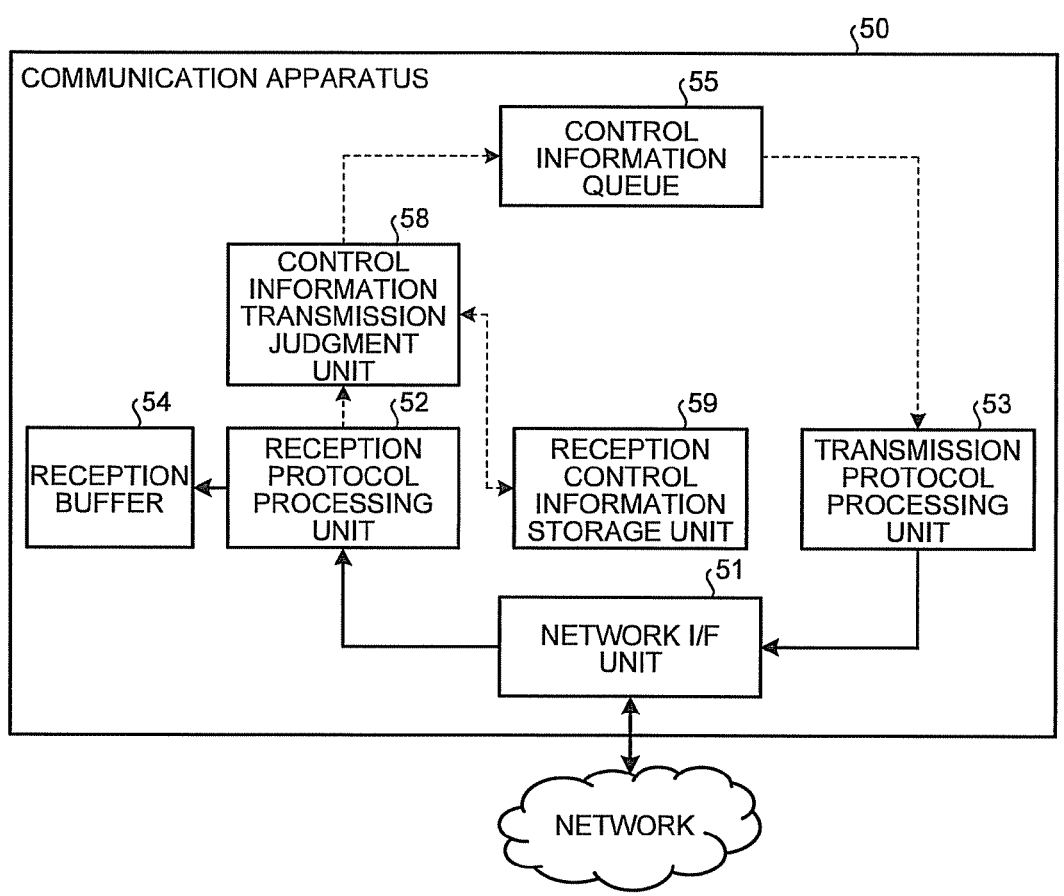
FIG. 9 is a diagram illustrating a functional configuration of a communication apparatus according to a third embodiment.

FIG. 9 is a diagram illustrating a functional configuration of a communication apparatus 50 according to the present embodiment. The communication apparatus 50 further includes a control information transmission judgment unit 58 and a reception control information storage unit 59 in addition to the configuration of the communication apparatus 50 according to the first embodiment. The control information transmission judgment unit 58 judges whether or not control information including at least control information included in the reception frame is to be stored in the control information queue 55 under control of the reception protocol processing unit 52. The reception control information storage unit 59 stores control information under control of the control information transmission judgment unit 58.

Figure 10:
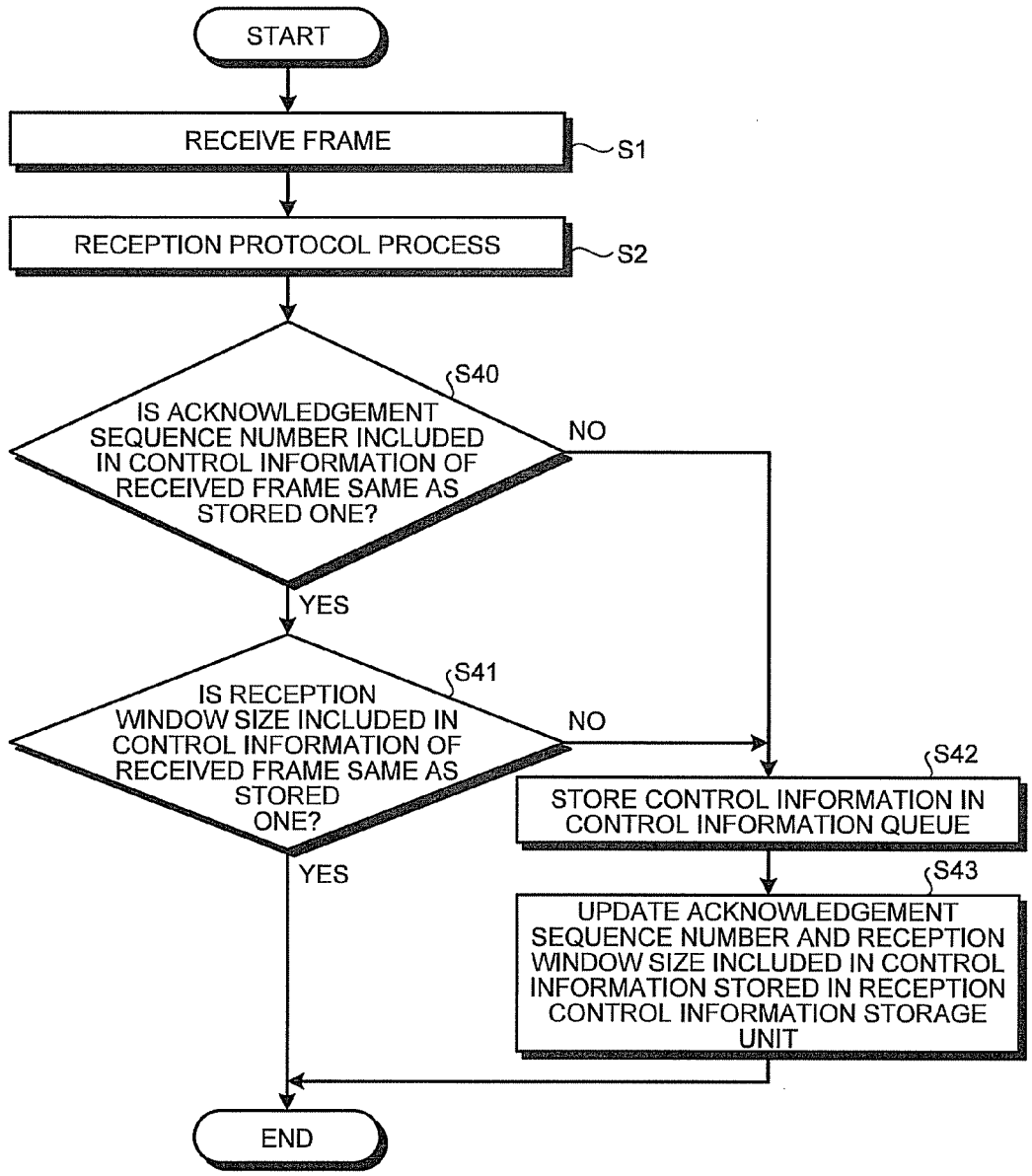
FIG. 10 is a flowchart illustrating a procedure of a reception process according to the embodiment.

Next, a procedure of a reception process performed by the communication apparatus 50 according to the present embodiment will be described with reference to FIG. 10. A transmission process is the same as in the first embodiment, and thus a description thereof is omitted. Step S1 and step S2 are the same as in the first embodiment. Incidentally, it is assumed that at least one of the acknowledgement sequence number of the counterpart apparatus and the reception window size of the counterpart apparatus is included in the control information acquired by the communication apparatus 50 in step S2. In step S40, the communication apparatus 50 judges whether or not the acknowledgement sequence number of the counterpart apparatus included in the control information acquired in step S2 is the same as the acknowledgement sequence number of the counterpart apparatus included in the control information stored in the reception control information storage unit 59 through the function of the control information transmission judgment unit 58. When they are different (No in step S40), the communication apparatus 50 stores the control information acquired in step S2 in the control information queue 55 (step S42) and stores the control information, in which at least one of the acknowledge sequence number and the reception window size has been updated, in the reception control information storage unit 59 (step S43). In contrast, when the acknowledgement sequence number of the counterpart apparatus included in the control information acquired in step S2 is the same as the acknowledgement sequence number of the counterpart apparatus included in the control information stored in the reception control information storage unit 59 (Yes in step S40), the communication apparatus 50 judges whether or not the reception window size of the counterpart apparatus included in the control information acquired in step S2 is the same as the reception window size of the counterpart apparatus included in the control information stored in the reception control information storage unit 59 (step S41). When they are different (No in step S41), the communication apparatus 50 performs step S42 and step S43 as described above.

As described above, since the control information is transmitted to the transmission protocol processing unit 53 only when at least one of the acknowledgement sequence number and the reception window size of the counterpart apparatus included in the control information of the reception frame is updated, it is possible to reduce the processing load of the transmission protocol processing unit 53.

Next, a fourth embodiment of a communication apparatus, a method, and a program will be described. Parts that are common in the first embodiment to the third embodiment will be described using the same reference numerals and a description thereof will be omitted.

Figure 11:
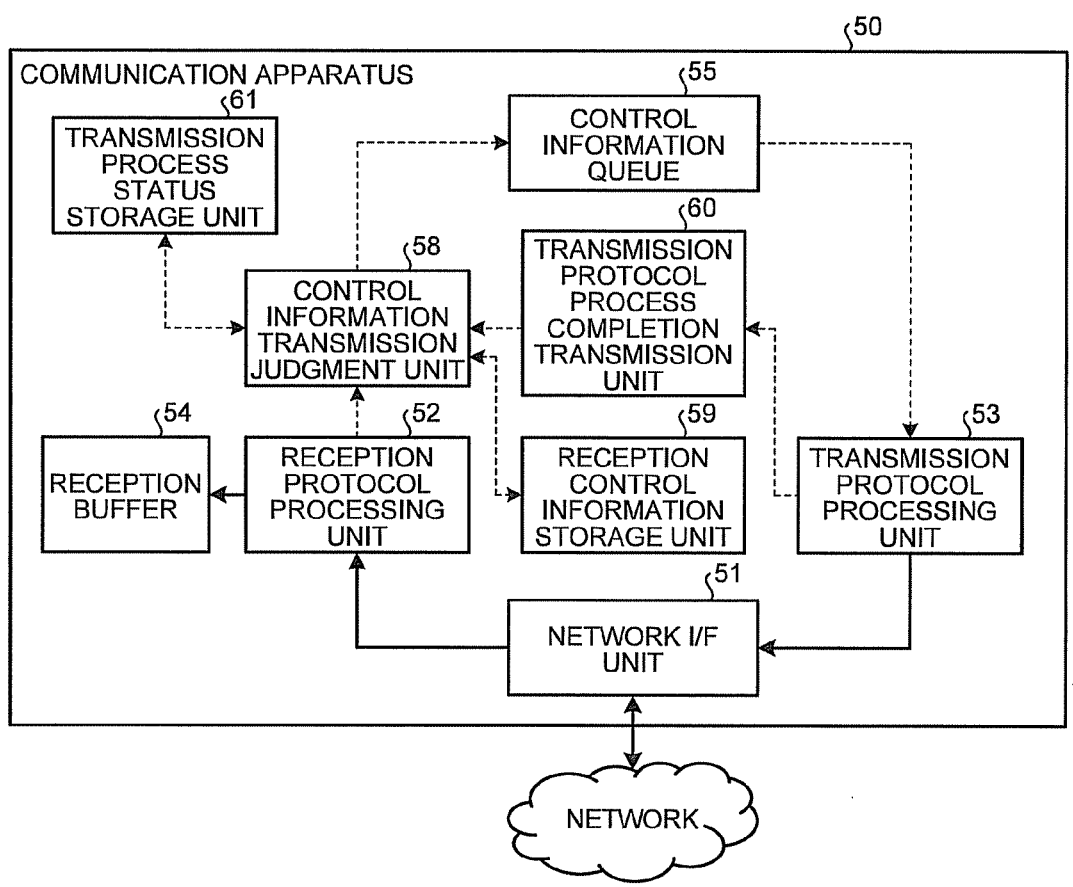
FIG. 11 is a diagram illustrating a functional configuration of a communication apparatus according to a fourth embodiment.

In the present embodiment, the communication apparatus 50 performs communication using a protocol that performs a cumulative acknowledgement. The cumulative acknowledgement refers to a technique of performing an acknowledgement of one or more reception frames by transmission of one frame including an acknowledgement. FIG. 11 is a diagram illustrating a functional configuration of a communication apparatus 50 according to the present embodiment. The communication apparatus 50 further includes a transmission protocol process completion transmission unit 60 and a transmission process status storage unit 61 in addition to the configuration of the communication apparatus 50 according to the first embodiment. The transmission protocol processing unit 53 performs the above described transmission protocol process to generate a frame including an acknowledgement and notifies the transmission protocol process completion transmission unit 60 of completion of the transmission protocol process after the transmission protocol process is completed. The transmission protocol process completion transmission unit 60 notifies the control information transmission judgment unit 58 of completion of the transmission protocol process. The transmission process status storage unit 61 stores a process status of transmission of the frame including the acknowledgement (referred to as "transmission process status") under control of the control information transmission judgment unit 58. As the transmission process status, there are three statuses including an "unprocessed," "during processing," and "reserved." An initial status of the transmission process status is "unprocessed." In addition to the above described function according to the third embodiment, the control information transmission judgment unit 58 updates the transmission process status stored in the transmission process status storage unit 61 according to a status when completion of the transmission protocol process is notified from the transmission protocol process completion transmission unit 60.

Figure 12:
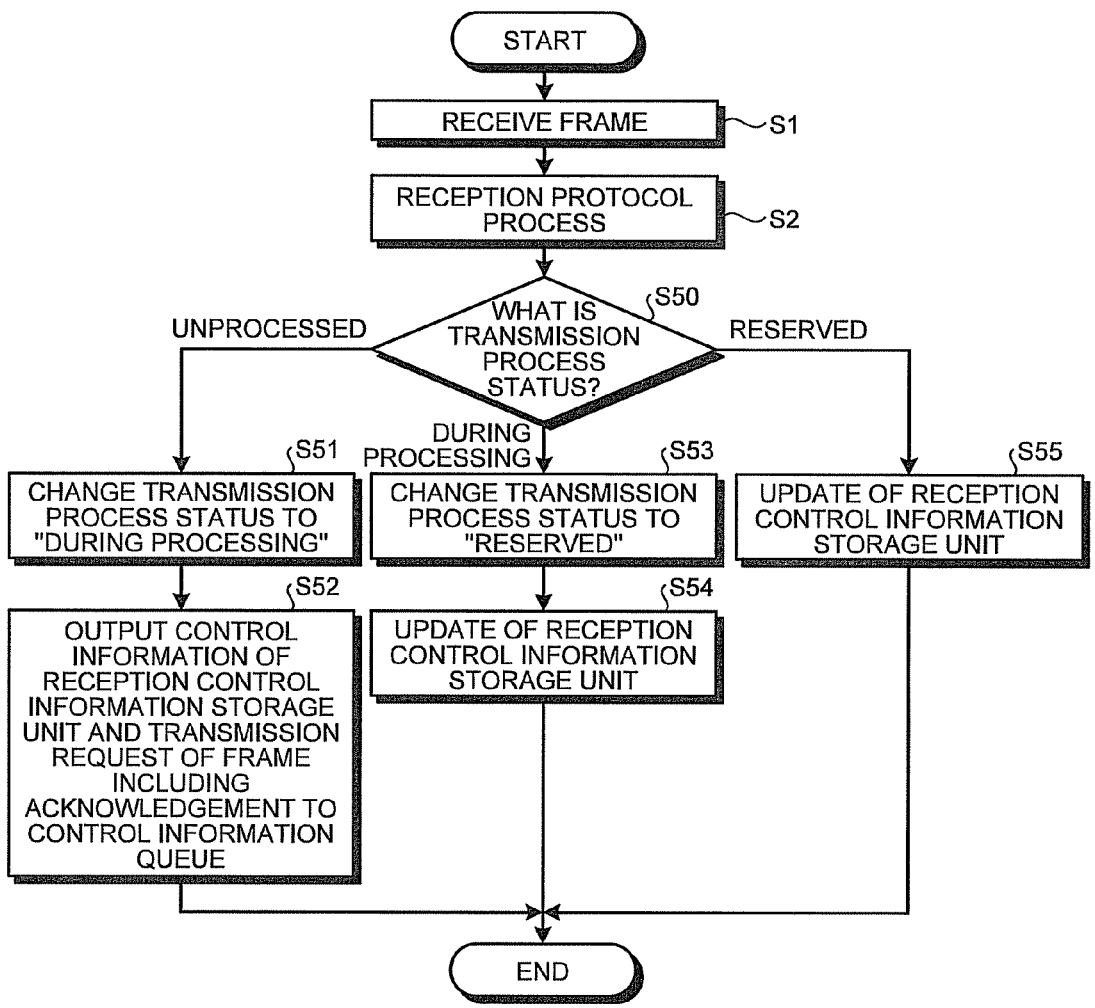
FIG. 12 is a flowchart illustrating a procedure of a reception process according to the embodiment.

Next, procedures of a reception process and a transmission process performed by the communication apparatus 50 according to the present embodiment will be described. The procedure of the reception process will be described with reference to FIG. 12. Step S1 and step S2 are the same as in the first embodiment. Incidentally, it is assumed that the sequence number assigned by the counterpart apparatus is included in the control information acquired by the communication apparatus 50 in step S2. In step S50, when the communication apparatus 50 judges that the transmission process status is "unprocessed" by referring to the transmission process status stored in the transmission process status storage unit 61, the transmission process status is changed to "during processing" (step S51). According to the control information stored in the reception control information storage unit 59, the control information including the transmission request of the frame including the acknowledgement is stored in the control information queue 55 together with the reception window size of the communication apparatus 50 and the largest sequence number among the sequence numbers included in the control information of the reception frame on which the reception protocol process has been performed in step S2 (step S52). When the transmission process status is "during processing," the communication apparatus 50 changes the transmission process status to "reversed" (step S53) and updates the control information stored in the reception control information storage unit 59 to the control information including the reception window size of the communication apparatus 50 and the largest sequence number among the sequence numbers included in the control information of the reception frame on which the reception protocol process has been performed in step S2 (step S54). When the transmission process status is "reserved," the communication apparatus 50 updates the control information stored in the reception control information storage unit 59 to the control information including the reception window size of the communication apparatus 50 and the largest sequence number among the sequence numbers included in the control information of the reception frame on which the reception protocol process has been performed in step S2 (step S55).

Figure 13:
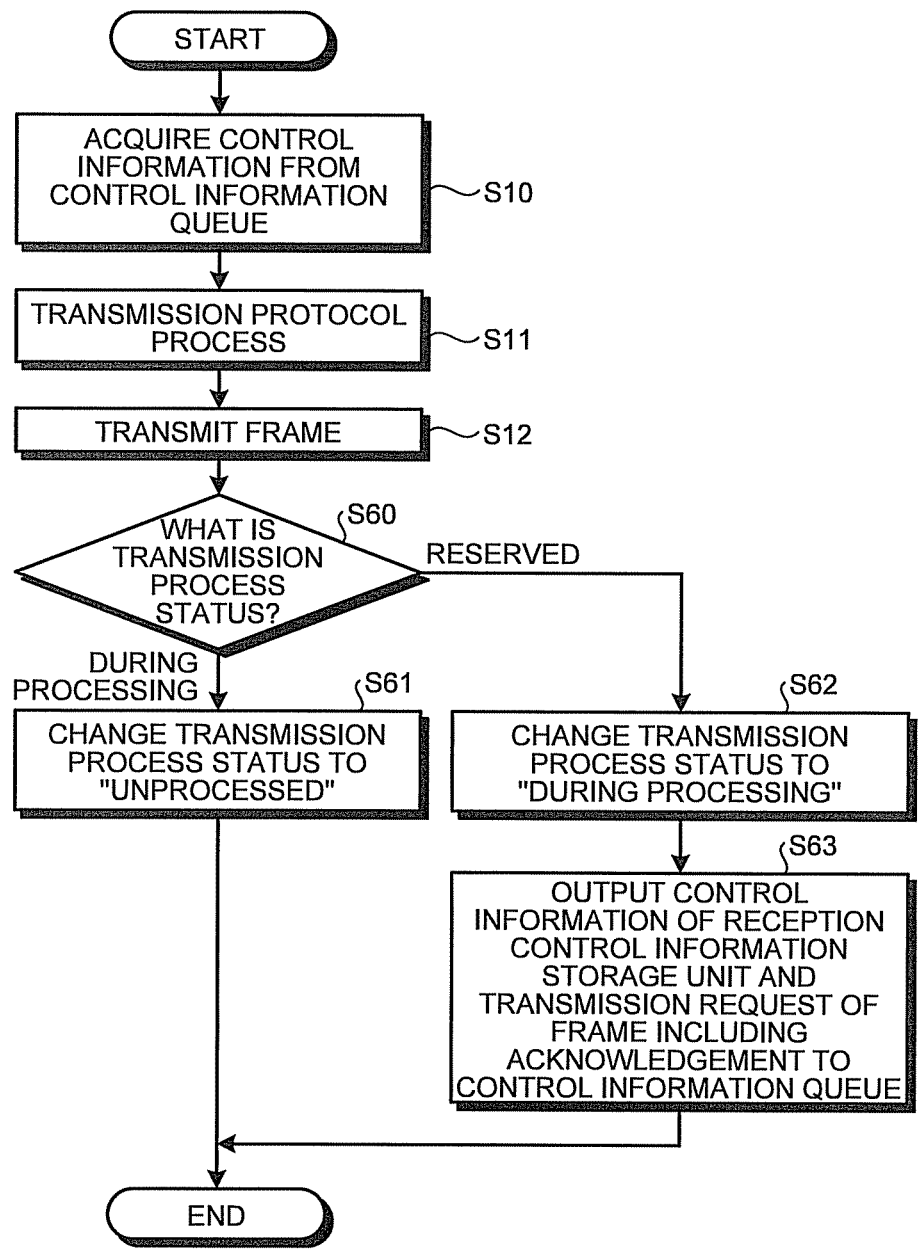
FIG. 13 is a flowchart illustrating a procedure of a transmission process according to the embodiment.

Next, the procedure of the transmission process will be described with reference to FIG. 13. Step S10 to step S12 are the same as in the first embodiment. In step S60, after the transmission protocol process is performed by the function of the transmission protocol processing unit 53 in step S11, when completion of the transmission protocol process is detected by the function of the transmission protocol process completion transmission unit 60, the communication apparatus 50 updates the transmission process status stored in the transmission process status storage unit 61 by the function of the control information transmission judgment unit 58. Specifically, when the transmission process status is "during processing," the communication apparatus 50 changes the transmission process status to "unprocessed" (step S61). Further, when the transmission process status is "reserved," the transmission process status is changed to "during processing" (step S62). Then, the communication apparatus 50 includes the transmission request of the frame including the acknowledgement in the control information together with the sequence number and the reception widow size included in the control information stored in the reception control information storage unit 59 and stores the control information in the control information queue 55. When the control information has been acquired in step S10, the frame including the acknowledgement generated in step S11 according to the control information is transmitted in step S12.

As described above, when the transmission protocol process is completed, the process status of the transmission protocol process (transmission process status) is updated, and when the reception frame is received, it can be judged whether or not the transmission protocol process is being performed by referring the transmission process status. In the case in which the transmission protocol process is being performed when the reception frame is received, the reception window size and the sequence number included in the control information stored in the reception control information storage unit 59 are updated using the control information of the reception frame. As a result, in the frame including the acknowledgement that should be transmitted in response to the reception frame, the acknowledgement sequence number can be assigned using the largest sequence number of the reception frame on which the frame including the acknowledgement is not transmitted yet, and thus the cumulative acknowledgement can be performed. That is, according to the present embodiment, since it is possible to generates and transmit the frame including the acknowledgement according to the transmission speed of the transmission protocol process, the number of times that the frame including the acknowledgement is transmitted can be reduced according to the process speed.

In each of the above described embodiments, various programs executed by the communication apparatus 50 may be configured to be stored on a computer connected to a network such as the Internet and may be downloaded via the network for provision. The various programs may be files of an installable format or an executable format and may be configured to be recorded on a computer readable recording medium such as a compact disk read only memory (CD-ROM), a flexible disk (FD), a compact disk rewritable (CD-R), and a digital versatile disk (DVD) for provision.

In each of the above described embodiments, the reception protocol processing unit 52 and the transmission protocol processing unit 53 may be program tasks that independently operate on the same computer that configures the communication apparatus 50 or may be configured with different processors by hardware. Similarly, the network I/F unit 51 may also be a program task that independently operates on the same computer that configures the communication apparatus 50 or may be configured by a processor different from those of the reception protocol processing unit 52 and the transmission protocol processing unit 53.

The above described embodiments have been described in connection with the case of using the TCP as the protocol of the transport layer. However, even in the case of using the protocol such as the SCTP or the DCCP instead of the TCP or even in the case of using the protocol such as the data link layer or the network layer, the configurations according to the embodiments can be applied.

In each of the above described embodiments, the reception protocol processing unit 52 may transmit the control information to the transmission protocol processing unit 53 not only when the reception window size changes but also when the frame is received. For example, when the CPU of the communication apparatus 50 executes an application program, a data mount of the reception buffer 54, that is, the reception window size can change in accordance with data processing performed by the application program. The application program notifies the reception protocol processing unit 52 of the changed reception window size, and thus the reception protocol processing unit 52 detects a change in the reception window size. In this case, the reception protocol processing unit 52 stores the control information including the reception window size in the control information queue 55. The transmission protocol processing unit 53 acquires the control information from the control information queue 55, and thus the control information that has been updated by the change in the reception window size is transmitted to the transmission protocol processing unit 53. The transmission protocol processing unit 53 performs the transmission protocol process using the acquired control information as in the above embodiments and then transmits the frame.

According to such a configuration, when the reception window size changes, the control information can be updated and the transmission protocol process can be performed using the latest control information.

Figure 14:
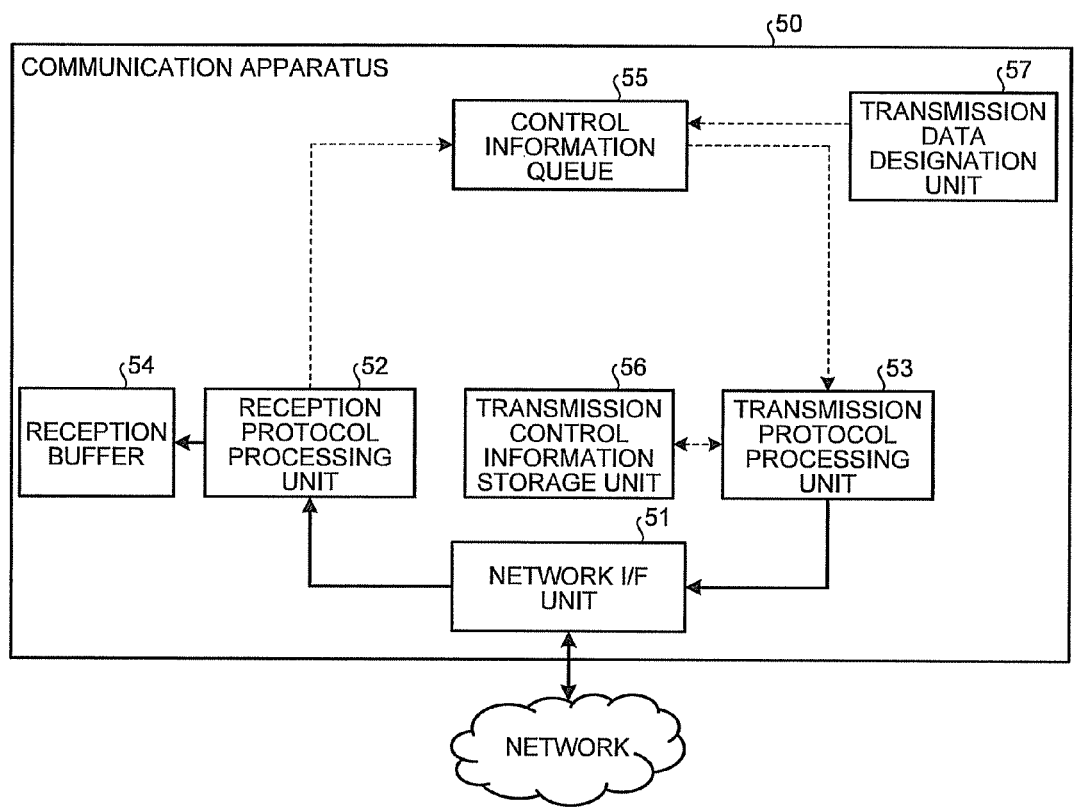
FIG. 14 is a diagram illustrating a functional configuration of a communication apparatus according to a modified embodiment.

In the above described second embodiment, an address and a data length of data of a transmission target may be designated as control information, and as illustrated in FIG. 14, a transmission data designation unit 57 may include the address and the data length of the data of the transmission target and the transmission request of the data in the control information and store the control information in the control information queue 55. When the control information is acquired from the control information queue 55, the transmission protocol processing unit 53 performs the transmission protocol process, generates a frame including the data of the transmission target according to the control information, and transmits the frame through the network I/F unit 51.

Figure 15:
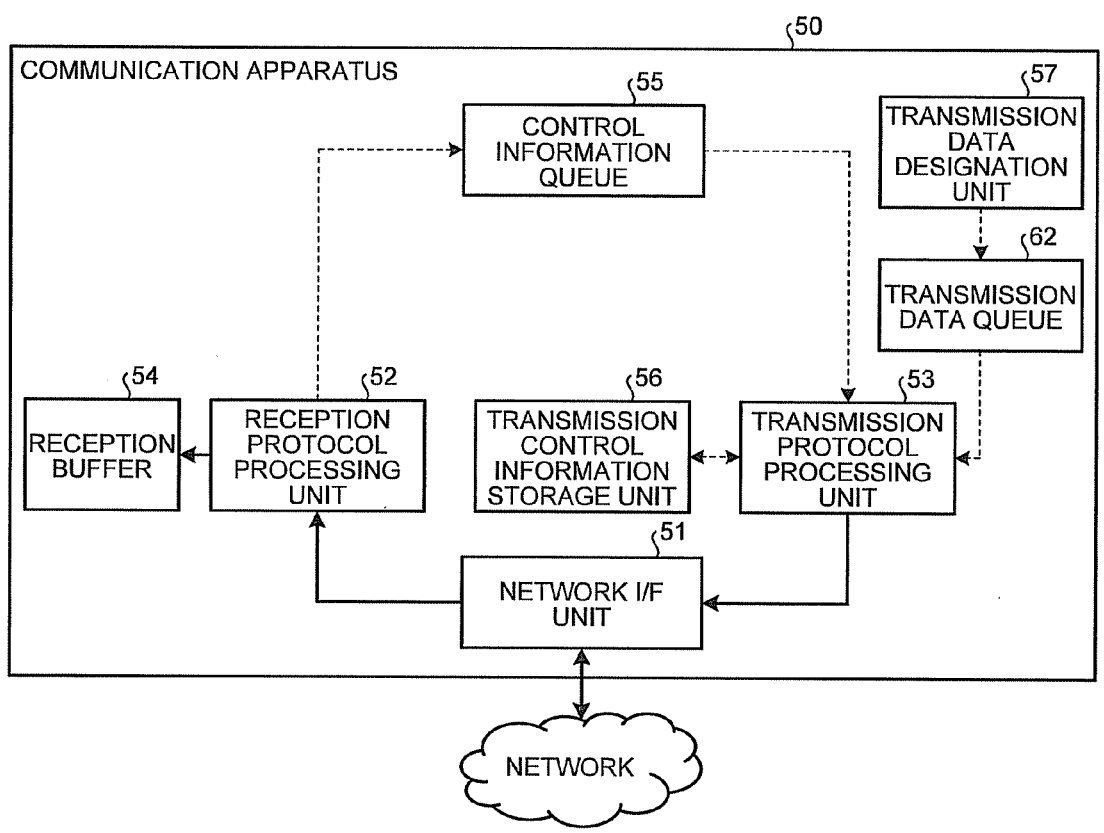
FIG. 15 is a diagram illustrating a functional configuration of a communication apparatus according to a modified embodiment.

Further, as illustrated in FIG. 15, a transmission data queue 62 that is connected to the transmission protocol processing unit 53 and the transmission data designation unit 57 may be separately installed. In this case, the above described data transmission process may be performed such that the transmission data designation unit 57 stores data information including an address and a data length of data of a transmission target in the transmission data queue 62, and the transmission protocol processing unit 53 acquires the data information from the transmission data queue 62.

In the above described second embodiment, the transmission control information storage unit 56 may store the control information for each connection.

Further, in the above described fourth embodiment, the reception control information storage unit 59 may store the control information for each connection, and the transmission process status storage unit 61 may store the transmission process status for each connection. In this case, the transmission protocol processing unit 53 may perform notification of completion of the transmission protocol process when the transmission protocol process on the frame including the acknowledgement is completed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication apparatus, comprising:
    a network interface unit that performs transmission and reception of a frame with other communication apparatus via a network;
    a reception protocol processing unit that comprises first processing hardware, acquires control information by performing a protocol process related to the reception of the received frame and acquires data when the data is included in the received frame;
    a reception buffer that stores the data included in the received frame;
    a control information queue that stores a reception window size representing a data capacity of the reception buffer of the communication apparatus and the control information including area information representing an area of data to be next received by the communication apparatus, the reception window size and the area information associated with each other, the control information stored in a sequence that the reception protocol processing unit acquired the control information, and outputs the control information in the sequence that the control information is stored; and
    a transmission protocol processing unit that comprises second processing hardware, operates independently of and in parallel to the reception protocol processing unit, reads out the control information in the sequence that the control information queue outputs the control information, performs a protocol process related to the transmission using the control information read out in the sequence that the control information queue outputs the control information, generates a frame of a transmission target including the area information and the reception window size, and transmits the frame through the network interface unit.

2. The communication apparatus according to claim 1, wherein the reception protocol processing unit includes a transmission request of a frame for an acknowledgement request in the control information when the acknowledgement is required on the received frame, and the control information queue stores the control information including the transmission request of the frame.

3. The communication apparatus according to claim 2, further comprising a detection unit that detects a change in the reception window size of the communication apparatus, wherein the control information queue stores the control information including the reception window size when the change in the reception window size is detected.

4. The communication apparatus according to claim 3, wherein the control information further includes a reception window size representing a data amount of a reception buffer of the other communication apparatus and area information representing area of data received by the other communication apparatus.

5. The communication apparatus according to claim 4, wherein the area information is a sequence number assigned by the other communication apparatus,
    the control information includes at least the sequence number,
    the communication apparatus further comprises
        a transmission control information storage unit that stores the control information including the largest sequence number among the control information used by the transmission protocol processing unit for the protocol process, and
        a transmission data designation unit that designates data of a transmission target, and
    the transmission protocol processing unit performs the protocol process on the designated data using the control information stored in the transmission control information storage unit, generates a frame including the data, and transmits the frame through the network interface unit.

6. The communication apparatus according to claim 5, wherein the transmission data designation unit designates an address and a data length of data of the transmission target, and the transmission protocol processing unit acquires data of the designated data length from the designated address, performs the protocol process on the data using the control information stored in the transmission control information storage unit, generates a frame including the data, and transmits the frame through the network interface unit.

7. The communication apparatus according to claim 4, further comprising:
a judgment unit that judges whether or not the control information acquired by the reception protocol processing unit is to be stored in the control information queue; and
a reception control information storage unit that stores the control information according to a judgment result of the judgment unit,
wherein the judgment unit judges whether or not the control information acquired by the reception protocol processing unit is to be stored in the control information queue by comparing control information stored in the reception control information storage unit with the control information acquired by the reception protocol processing unit, and
the control information queue stores the control information when it is judged that the control information is to be stored in the control information queue.

8. The communication apparatus according to claim 7, wherein the judgment unit judges that the control information acquired by the reception protocol unit is to be stored in the control information queue when the control information stored in the reception control information storage unit is different from the control information acquired by the reception protocol processing unit, and
the reception control information storage unit stores the control information when it is judged that the control information is to be stored in the control information queue.

9. The communication apparatus according to claim 8, wherein the control information includes at least one of the reception window size of the other communication apparatus and the area information of the other communication apparatus,
the judgment unit judges that the control information acquired by the reception protocol unit is to be stored in the control information queue when the reception window size of the other communication apparatus included in the control information stored in the reception control information storage unit is different from the reception window size of the other communication apparatus included in the control information acquired by the reception protocol processing unit or/and when the area information of the other communication apparatus included in the control information stored in the reception control information storage unit is different from the area information of the other communication apparatus included in the control information acquired by the reception protocol processing unit.

10. The communication apparatus according to claim 4, further comprising:
a judgment unit that judges whether or not the control information acquired by the reception protocol processing unit is to be stored in the control information queue;
a reception control information storage unit that stores the control information according to a judgment result of the judgment unit;
a transmission unit that transmits completion of the protocol process related to transmission to the judgment unit;
a transmission process status storage unit that stores a process status of the protocol process related to transmission; and
a change unit that changes the process status when the reception protocol processing unit performs the protocol process or/and when completion of the protocol process is transmitted,
wherein the judgment unit judges whether or not the control information acquired by the reception protocol processing unit is to be stored in the control information queue according to the changed process status, and
the control information queue stores the control information when it is judged that the control information is to be stored in the control information queue.

11. The communication apparatus according to claim 10, wherein the process status is anyone of a first status representing "during processing," a second status representing "unprocessed," and a third status representing "reserved,"
the change unit changes the process status to the third status when the reception protocol processing unit performs the protocol process and the process status is the first status, changes the process status to the first status when the reception protocol processing unit performs the protocol process and the process status is the second status, changes the process status to the second status when completion of the protocol process is transmitted and the process status is the first status, and changes the process status to the first status when completion of the protocol process is transmitted and the process status is the third status,
the judgment unit judges that the control information is to be stored in the control information queue when the changed process status is the first status and judges that the control information is to be stored in the reception control information storage unit when the process status is the third status, and
the reception control information storage unit stores the control information when it is judged that the control information is to be stored in the reception control information storage unit.

12. The communication apparatus according to claim 11, wherein the control information includes at least one of the area information of the communication apparatus, the reception window size of the communication apparatus, and the transmission request of the frame for the acknowledgement request on the received frame.

13. The communication apparatus according to claim 1, wherein the control information further includes an address and a data length of the data included in the frame of the transmission target.

14. A communication method that is executed by a communication apparatus that includes a network interface unit, a reception protocol processing unit, a reception buffer, a control information storage control unit, a data storage control unit, and a transmission protocol processing unit, the method comprising:

performing transmission and reception of a frame with other communication apparatus via a network;

acquiring control information by performing a protocol process related to the reception of the received frame and acquiring data when the data is included in the received frame;

storing the data included in the received frame in the reception buffer;

storing a reception window size representing a data capacity of the reception buffer of the communication apparatus and the control information including area information representing an area of data to be next received by the communication apparatus, the reception window size and the area information associated with each other, the control information stored in a sequence that the control information is acquired, and outputting the control information in the sequence that the control information is stored; and reading out the control information in the sequence that the control information is outputted, performing a protocol process related to the transmission independently of and in parallel to the protocol process related to reception using the control information read out in the sequence that the control information is outputted, generating a frame of a transmission target including the area information and the reception window size, and transmitting the frame through the network interface unit.

15. A communication program product having a non-transitory computer readable medium including programmed instructions, wherein the instructions, when executed by a computer, causes the computer to perform:

performing transmission and reception of a frame with other communication apparatus via a network;

acquiring control information by performing a protocol process related to the reception of the received frame and acquiring data when the data is included in the received frame;

storing the data included in the received frame in a reception buffer;

storing a reception window size representing a data capacity of the reception buffer and the control information including area information representing an area of data to be next received by a communication apparatus, the reception window size and the area information associated with each other, the control information stored in a sequence that the control information is acquired, and outputting the control information in the sequence that the control information is stored; and reading out the control information in the sequence that the control information is outputted, performing a protocol process related to the transmission independently of and in parallel to the protocol process related to reception using the control information read out in the sequence that the control information is outputted, generating a frame of a transmission target including the area information and the reception window size, and transmitting the frame through the network interface unit.

* * * * *